(12) United States Patent
MacCormick (10) Patent No.: US 7,483,906 B2
(45) Date of Patent: Jan. 27, 2009

(54) METHOD AND SYSTEM FOR RENAMING CONSECUTIVE KEYS IN A B-TREE

(75) Inventor: John Philip MacCormick, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 10/823,870

(22) Filed: Apr. 14, 2004

(65) Prior Publication Data

US 2005/0234951 A1    Oct. 20, 2005

(51) Int. Cl.
*G06F 17/30* (2006.01)
(52) U.S. Cl. ................... 707/101; 707/3; 707/100; 707/200
(58) Field of Classification Search ............ 707/3, 707/100, 200, 101, 104.1
See application file for complete search history.

(56) References Cited

U.S. PATENT DOCUMENTS

| | | | | |
|---|---|---|---|---|
| 5,204,958 | A * | 4/1993 | Cheng et al. ............. | 707/102 |
| 5,619,693 | A * | 4/1997 | Troisi ...................... | 707/7 |
| 5,689,706 | A * | 11/1997 | Rao et al. ................. | 707/201 |
| 5,752,243 | A * | 5/1998 | Reiter et al. ............... | 707/3 |
| 5,832,487 | A * | 11/1998 | Olds et al. ................. | 707/10 |
| 6,192,365 | B1 | 2/2001 | Draper et al. .............. | 707/101 |
| 6,675,157 | B1 * | 1/2004 | Mitchell ..................... | 707/2 |
| 7,103,838 | B1 * | 9/2006 | Krishnamurthy et al. .... | 715/530 |
| 2002/0152226 | A1 * | 10/2002 | Burnett ..................... | 707/200 |
| 2002/0188598 | A1 * | 12/2002 | Myllymaki et al. ............ | 707/2 |
| 2002/0198891 | A1 * | 12/2002 | Li et al. .................... | 707/102 |
| 2003/0018646 | A1 * | 1/2003 | Ohta et al. ................. | 707/100 |
| 2003/0204513 | A1 * | 10/2003 | Bumbulis .................... | 707/100 |
| 2004/0205536 | A1 * | 10/2004 | Newman et al. ............. | 715/509 |
| 2005/0050107 | A1 * | 3/2005 | Mane et al. ................. | 707/200 |
| 2006/0173927 | A1 * | 8/2006 | Beyer et al. ................. | 707/201 |

FOREIGN PATENT DOCUMENTS

WO    WO 98/26353    6/1998

OTHER PUBLICATIONS

Bayer et al., "Prefix B-Trees", *ACM Transactions on Database Systems*, vol. 2, No. 1, pp. 11-26 (Mar. 1977).
Comer, Douglas, "The Ubiquitous B-Tree", *Computing Surveys*, vol. 11, No. 2 (Jun. 1979).
DeWitt et al., "Client-Server Paradise", *Proceedings of the VLDB Conference*, Santiago, Chile, 12 pgs (1994).
Ferragina et al., "The String B-Tree: A New Data Structure for String Search in External Memory and Its Application", *Journal of the ACM*, vol. 46, No. 2, pp. 236-280 (Mar. 1999).
Carey, M.J. et al., "Storage Management for Objects in Exodus", *Object Oriented Concepts and Databases*, 1989, Chapter 14, 1-30, XP-002399789.
Duncan, R., "Design Goals and Implementation of the New High Performance File System", *Microsoft Systems Journal*, 1989, 1-13, XP-000373999.

* cited by examiner

*Primary Examiner*—John E Breene
*Assistant Examiner*—Dennis Myint
(74) *Attorney, Agent, or Firm*—Woodcock Washburn LLP (57) ABSTRACT

An efficient method for renaming consecutive keys in a B-tree representing a hierarchical namespace, such as a file system, has an estimated time efficiency of O(logN), where N is the number of nodes in the B-tree. All the consecutive keys to be renamed are first excised from the original B-tree to form a trimmed B-tree, and the excised nodes are stored in a separate temporary extracted B-tree. The nodes in extracted B-tree are then renamed, and the renamed extracted B-tree is inserted into the trimmed B-tree to form a final B-tree that contains the renamed keys.

10 Claims, 7 Drawing Sheets

METHOD AND SYSTEM FOR RENAMING CONSECUTIVE KEYS IN A B-TREE

FIELD OF THE INVENTION

This invention pertains generally to computer data structures for storing and organizing data, and more particularly to renaming operations on keys stored in a B-tree data structure that represents a hierarchical namespace.

BACKGROUND OF THE INVENTION

A B-tree is a specialized multiway tree data structure that is designed for organizing data records for efficient data retrieval, especially when the data records are stored on a relatively slow storage media, such as a hard drive. Each node in a B-tree stores multiple keys for identifying the corresponding data records and pointers to child nodes of that node. The number of keys a node may store depends on the "order" of the B-tree. In a B-tree of order K, each node should contain from K to 2K keys. Using a larger K allows the B-tree to have a smaller height (or depth) for a given set of data records, thereby reducing the number of disk access that may be required to locate a desired data record.

The B-tree data structure may be used for organizing various types of data. For instance, a B-tree may be used for a hierarchical namespace in which the names are stored as keys in the B-tree. As an example, it has been proposed to use a B-tree for storing the metadata of a file system. In that application, the keys of the B-tree are the full pathnames of each file or directory. Most file system operations can be performed efficiently on such a data structure. Nevertheless, one important exception has been the rename operation. When a directory of the file system is to be renamed, the keys for all the nodes in the B-tree corresponding to files and subdirectories in that directory have to be changed accordingly. A naïve implementation of the rename operation would touch every file or subdirectories in the directory being renamed, which could be very inefficient. Conventionally, due to the inefficiency of the rename operation using the conventional approach, there has been the view that the B-tree data structure is unsuitable for managing a file system.

BRIEF SUMMARY OF THE INVENTION

In view of the foregoing, the present invention provides a method for modifying a B-tree that represents a hierarchical namespace in connection with the operation of renaming consecutive keys in the B-tree. In accordance with the invention, when a set of consecutive keys stored in a B-tree representing a hierarchical namespace are to be renamed, all the keys to be renamed are excised from the original B-tree and stored in a separate temporary "extracted tree." The excision turns the original B-tree into a "trimmed tree." The keys in the extracted tree are then renamed, and the renamed extracted tree is inserted into the trimmed tree to form a final B-tree that represents the hierarchical namespace with the renamed keys. The method of the invention is very efficient, with an estimated time complexity of O(logN), where N is the number of nodes in the B-tree. An example of a hierarchical namespace is a file system, and the renaming operation is to rename a directory in the file system, including modifying the names of the files and subdirectories in the directory. The efficiency of the method of the invention makes it highly feasible to use a B-tree data structure to store the metadata of a file system.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

A method and system for modifying a B-tree to reflect the renaming a set of consecutive keys in a B-tree that represents a hierarchical namespace, such as a file system, will now be described with respect to certain embodiments. The skilled artisan will readily appreciate that the method and system described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices.

The term computer system may be used to refer to a system of computers such as may be found in a distributed computing environment.

Figure 1:
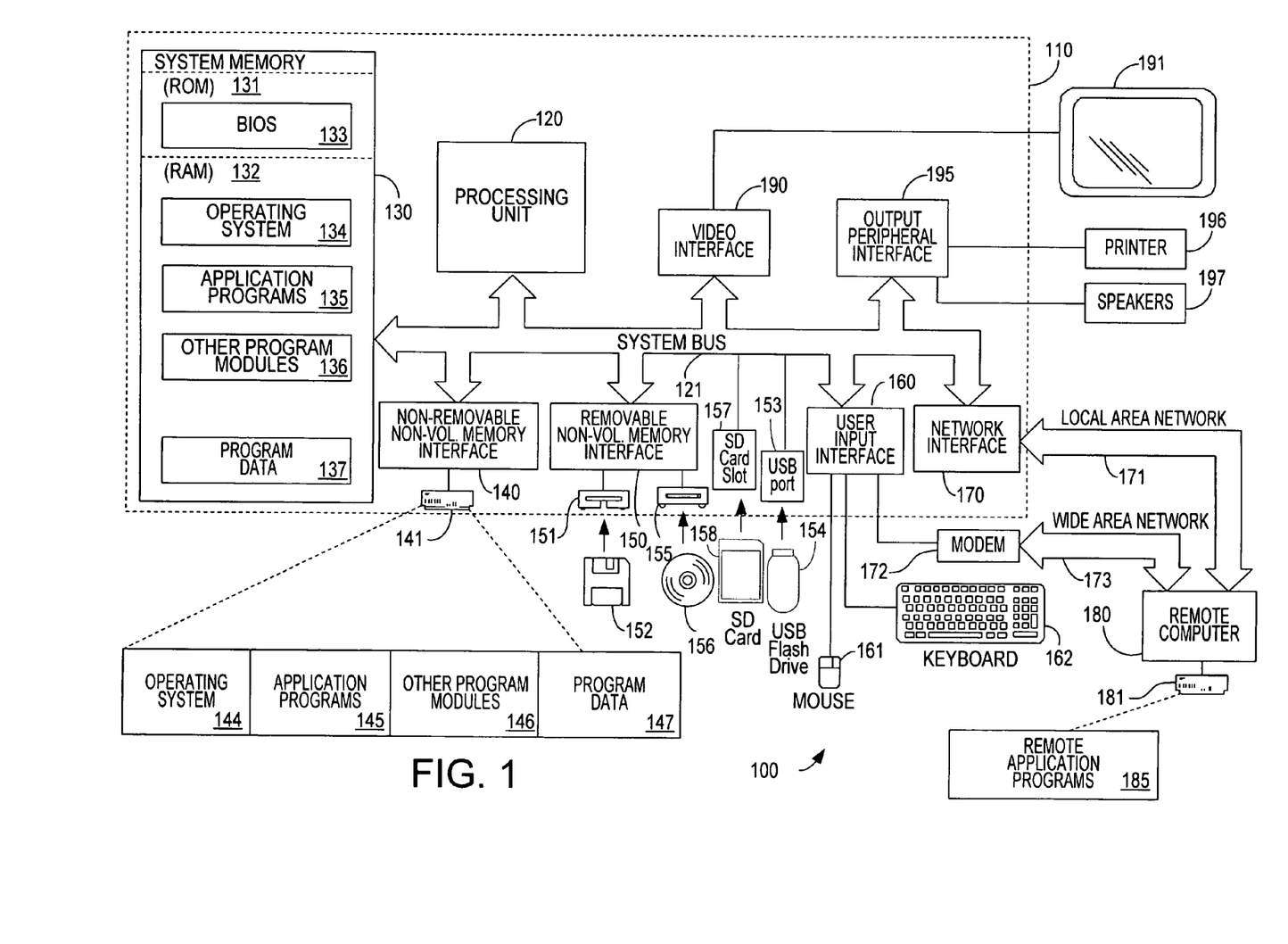
FIG. 1 is a simplified schematic diagram illustrating an exemplary architecture of a computing device for carrying out the method of renaming consecutive keys in the B-tree that represents a hierarchical namespace in accordance with the invention.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although at least one embodiment of the invention does include each component illustrated in the exemplary operating environment 100, another more typical embodiment of the invention excludes some or all non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer-readable media. Computer-readable media can be any available media that can be accessed by the computer 110 and includes both volatile and nonvolatile media, and removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other storage medium. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 130 includes computer storage media in the form of volatile and/or nonvolatile memory such as read only memory (ROM) 131 and random access memory (RAM) 132. By way of example, and not limitation, FIG. 1 illustrates operating system 134, application programs 135, other program modules 136 and program data 137.

The computer 110 may also include other removable and nonremovable, volatile and nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150. The computer system may include of interfaces for additional types of removable non-volatile storage devices. For instance, the computer may have a USB port 153 that can accept a USB flash drive (UFD) 154, or a SD card slot 157 that can accept a SD memory card 158. Other types of removable storage media may also be used for implementing the invention.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing an operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 by way of an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 preferably operates or is adaptable to operate in a networked environment using logical connections to one or more remote computers, such as a remote computer 180. The remote computer 180 may be a personal computer, a server, a router, a peer device or other network node, and typically includes some or all of the elements described above relative to the computer 110, although only a memory storage device 181 has been illustrated in FIG. 1. The logical connections depicted in FIG. 1 include a LAN 171 and a WAN 173, but may also include other networks. For example, in the present invention, the computer 110 may comprise the source machine from which data is being migrated, and the remote computer 180 may comprise the destination machine. Note however that source and destination machines need not be initially connected by a network or otherwise, but instead, data may be migrated by way of any media capable of being written by the source platform and read by the destination platform or platforms. For example, one non-limiting instance of such a medium is a portable flash memory medium, sometimes referred to as a memory "key" or memory "stick." Other non-limiting examples will be given below.

When used in a LAN environment, the computer 1 10 is connectable to the LAN 171 through a network interface or adapter 170. The computer 1 10 may also include a modem 172 or other means for establishing communications over the WAN 173. The modem 172, which may be internal or external, may be connected to the system bus 121 by way of the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
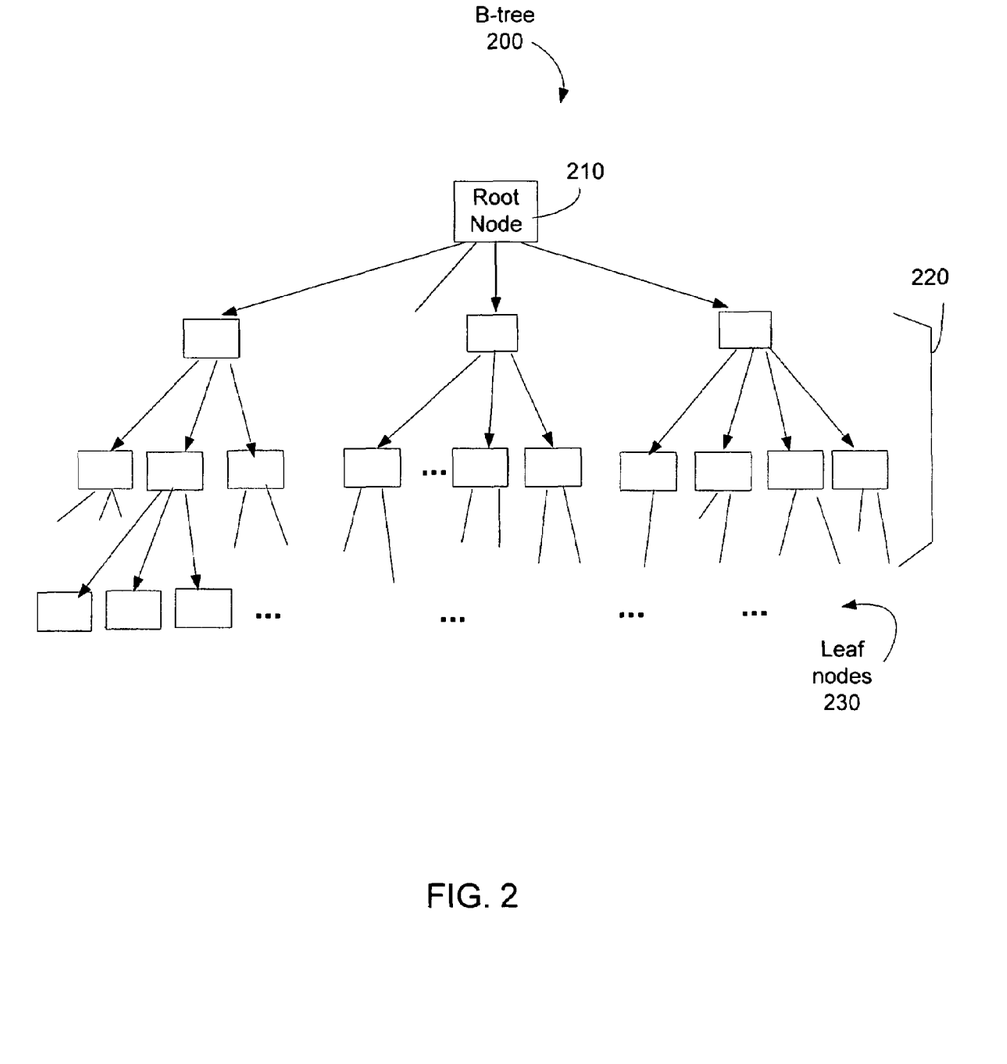
FIG. 2 is a schematic diagram illustrating a B-tree used in an embodiment of the invention for a file system with nodes of a directory that is to be renamed.

Turning to FIG. 2, the present invention is directed to an efficient method for renaming consecutive keys in a B-tree data structure that represents a hierarchical namespace, in which the names of the namespace are stored as keys at the nodes of the B-tree. As used herein, the term "consecutive keys" means all keys in the B-tree that are within a given range of key values. Those keys are stored in the B-tree in a consecutive order based on their values, although the nodes where they are stored may be on different levels of the B-tree. Hierarchical namespaces are ubiquitous in computer science. Examples of hierarchical namespaces include, for example, the Domain Name System (DNS) for looking up names of computers on the Internet, and Active Directories that are used to store names and attributes of entities on a corporate network or the like. Active Directory is a product of Microsoft Corporation. In the following description, the invention will be described in connection with an embodiment in which the hierarchical namespace is that of a file system, and the renaming operation renames a directory of the file system, wherein the set of consecutive keys to be modified represent the names of files and subdirectories in the directory. It will be appreciated, however, that the method of the invention is not limited to renaming file systems and can be used in a wide range of applications for renaming consecutive keys in any B-tree structure representing hierarchical namespaces.

As illustrated in FIG. 2, the B-tree 200 has multiple nodes connected in a tree structure, with a root node 210, one or more intermediate levels of nodes 220, and multiple leaf nodes 230. The B-tree has an "order" of K, where K is an integer that may be 1 or higher. The number 2K is the maximum number of child nodes each node may have. The keys have a natural order, say alphabetical, so that one can refer to the key-sequence order of a file.

In one embodiment of the invention, the B-tree is used to store metadata for the directories and files in the file system to allow the directories and files to be quickly located and accessed. The keys of the B-tree are full path names of the corresponding files and subdirectories of the file system. For example, a key of one node in the B-tree may be A/MyDocuments/Letters/Letter1, where Letter1 is a file in the directory of Letters, which is in the directory of MyDocuments, which is in turn in the directory A. To optimize the tree to minimize the number of disk accesses for each file retrieval, the B-tree is "balanced" such that each node in the B-tree has N keys, where N is between K to 2K, and N+1 pointers. The pointers and keys of each node are arranged in the form of $p_0 v_1 p_1 v_2 p_2 \ldots v_N p_N$, where $p_i$ is the ith pointer and $v_i$ is the ith key of the node. Each pointer points to a child node, which may have its own keys and pointers (except when the node is a leaf node). It should be noted that the directory levels of the file system do not have to correspond to the node levels in the B-tree that stores the directory paths of the file system.

When a directory in the file system represented by the B-tree is renamed, the pathnames of the directory and all the subdirectories and files in that directory are changed. In this case, the names of all the files and subdirectories of the directory to be renamed form a set of consecutive keys in the B-tree, although the keys may be stored at nodes on different levels of the tree structure. As a result of the renaming the directory, multiple new keys are created for the new pathnames. The existing keys for the old pathnames have to be removed from the B-tree, and the new keys have to be added in proper positions in the B-tree. The present invention provides a mechanism that allows the modification of the B-tree for renaming a set consecutive keys to be carried out efficiently, with an estimated time complexity of O(logN), where N is the total number of nodes in the B-tree.

Figure 3:
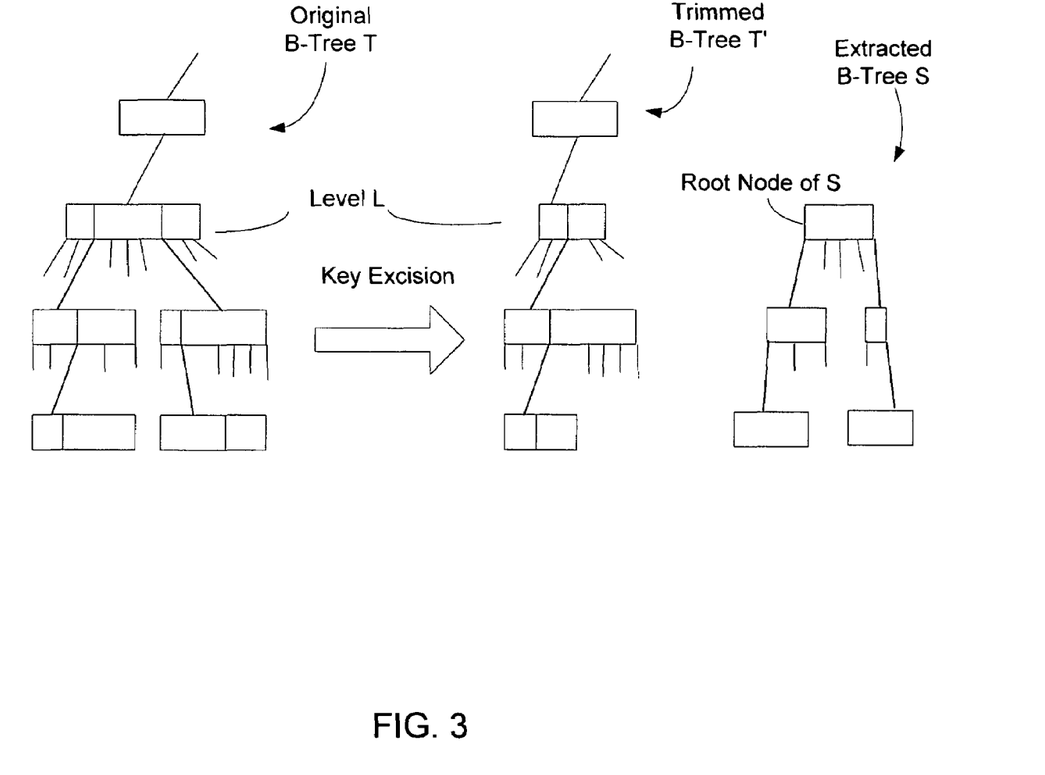
FIG. 3 is a schematic diagram illustrating the generation of two intermediate tree structures from an original B-tree by excising keys of the directory to be renamed in a method of an embodiment of the invention.

The concept of the method of the invention for renaming consecutive keys in a B-tree is now described with reference to an embodiment illustrated FIGS. 3-5, in which a file system is represented by a B-tree, and the renaming operation involves renaming a directory in the file system. In FIG. 3, the B-tree (labeled as T) represents the file system before a directory in the file system is renamed. The process of modifying the original B-tree T to include new keys created by renaming a directory involves the generation of two temporary data structures from the original B-tree. The two temporary data structure are tree-like structures that may be nearly, but not quite B-trees in the conventional sense. Specifically, one temporary tree (labeled as T') is generated by excising all the keys for the files and subdirectories of the directory to be renamed from the original B tree T. This temporary tree T' is referred to as the "trimmed tree." In FIG. 3, the portions of the nodes containing the keys to be excised from the original B-tree are hashed for illustration purposes. These keys excised from the original B tree T are stored in the second tree data structure (labeled as S) that is referred to as the "extracted tree."

Both the trimmed tree T' and extracted tree S may not meet the regular definition of a B-tree because they may be under-full, i.e., each of their nodes may not have at least K keys. For purposes of this invention, an "under-full B-tree" of order K is defined as a data structure that satisfies all the conditions of a Kth-order B-tree, except that its nodes may contain fewer then K keys. Thus, the trimmed tree T' and the extracted tree S may be under-full B-trees. The temporary trees T' and S generated in the process of modifying the B-tree T will be referred to as "B-trees," with the understanding that they may be under-full or even over-full at some points of the process.

Figure 4:
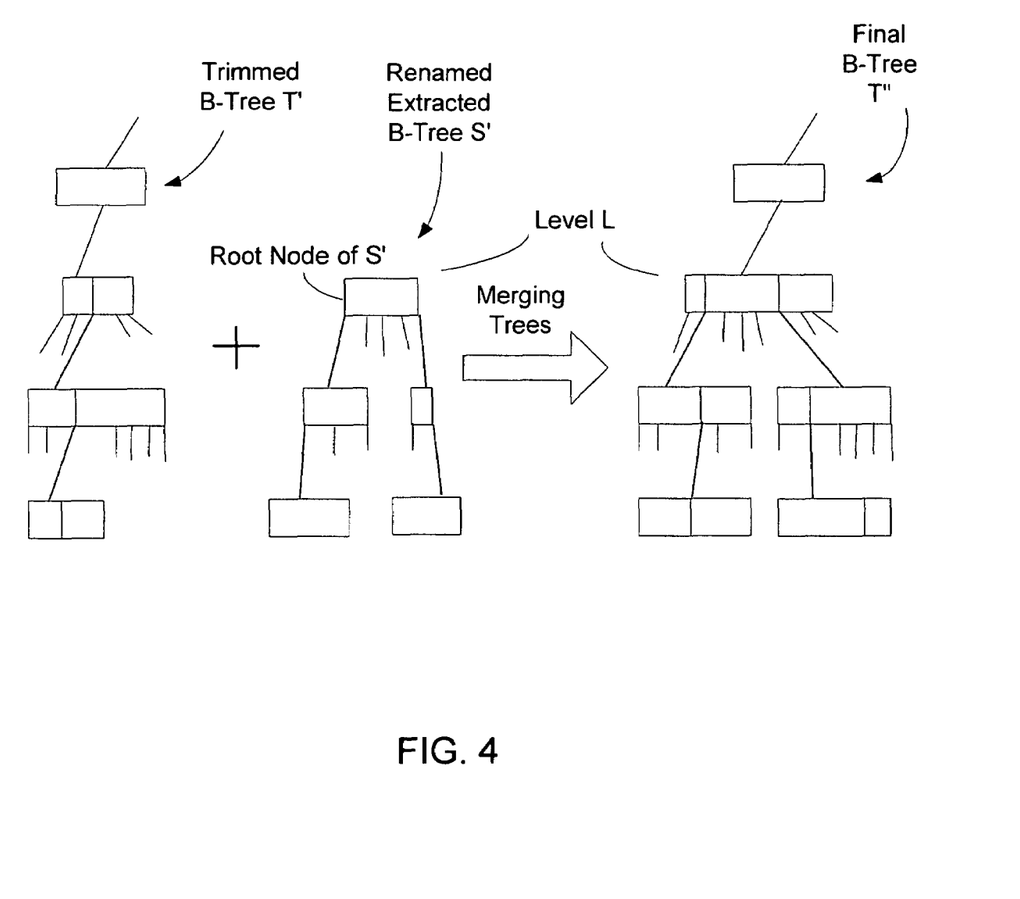
FIG. 4 is a schematic diagram illustrating the construction of a final B-tree from two intermediate tree structures formed in a method of an embodiment of the invention.

Referring now to FIG. 4, after the trimmed tree T' and the extracted tree S are constructed, the keys in the extracted tree S are modified to reflect the renaming of the directory. The key modification results in a modified extracted tree that is labeled S'. Each key in S' is the new pathname of a corresponding file or subdirectory of the renamed directory. The modified extracted tree S' is then inserted into the trimmed tree T'. It would be appreciated that the locations in the trimmed tree where the keys of the tree S' are to be inserted are different from those locations where the excised keys are taken from the original tree, because the values of the keys have changed. The final B-tree T'' that results from the insertion of the tree S' into the trimmed tree T' now represents the file system after the directory has been renamed.

Figure 5:
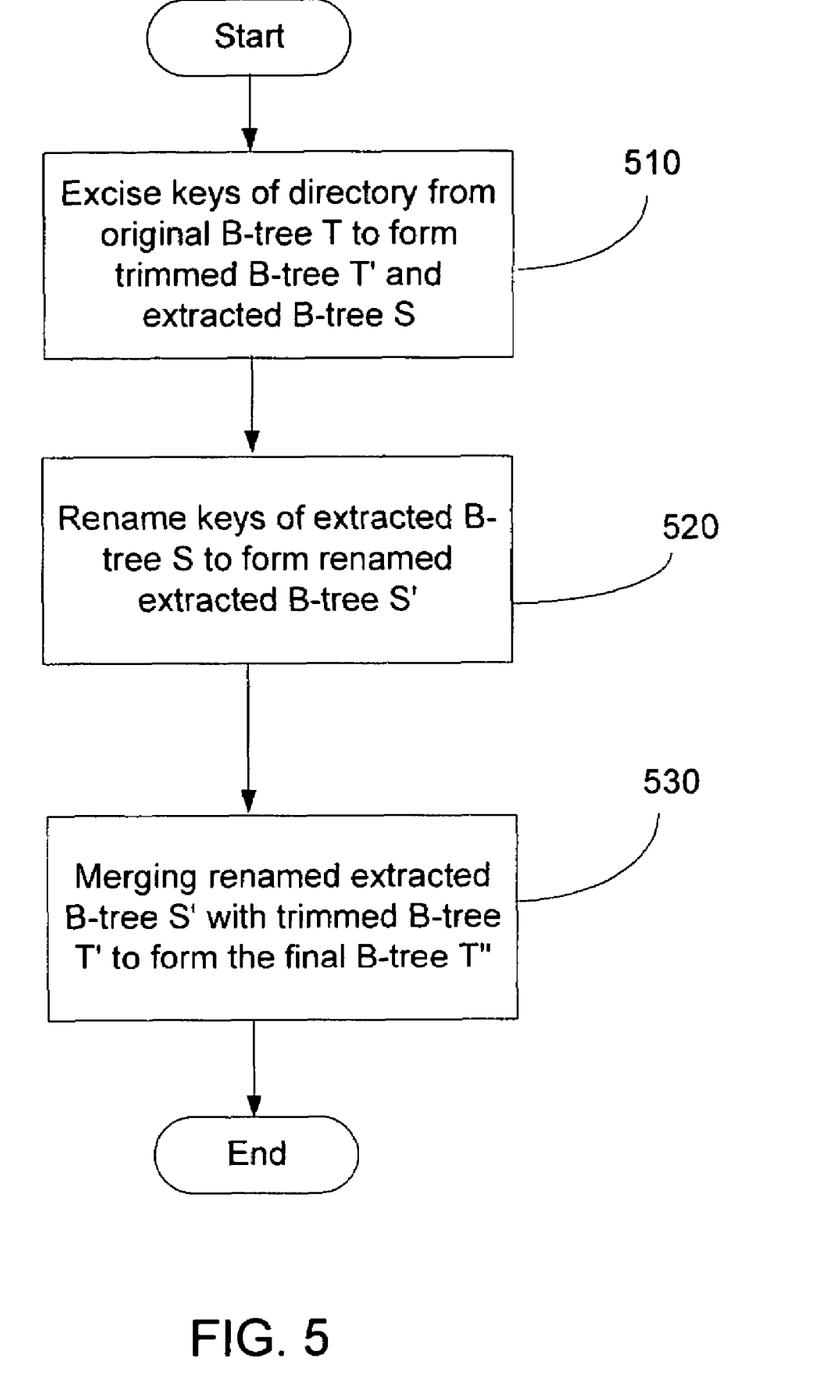
FIG. 5 is a flow diagram showing high-level steps of a method of an embodiment of the invention for renaming a directory in a B-tree data structure.

The naming process of the embodiment of the invention is now summarized at a high conceptual level by way of an example with reference to FIG. 5. To facilitate the description, it is assumed that a directory named "Y" is to be renamed to "Z." The B-tree modification begins with removing all keys beginning with "Y/" from the B-tree T. In this example, it is assumed that the directory components are delineated by the special character "/". With the removal of the keys of the directory, the original B-tree T becomes a new, possibly under-full, B-tree T', and the removed keys are stored in another new, possibly under-full, B-tree S (step 510). The keys in the extracted tree S are then changed so that they have the prefix "Z/" instead of "Y/". This results in the possibly under-full B-tree S' (step 520). Thereafter, the modified extracted tree S' is inserted into the trimmed tree T', to form a new B-tree T", which represents the file system with the renamed directory (step 530). Each of these three steps in FIG. 5 is described in greater detail below.

Figure 6:
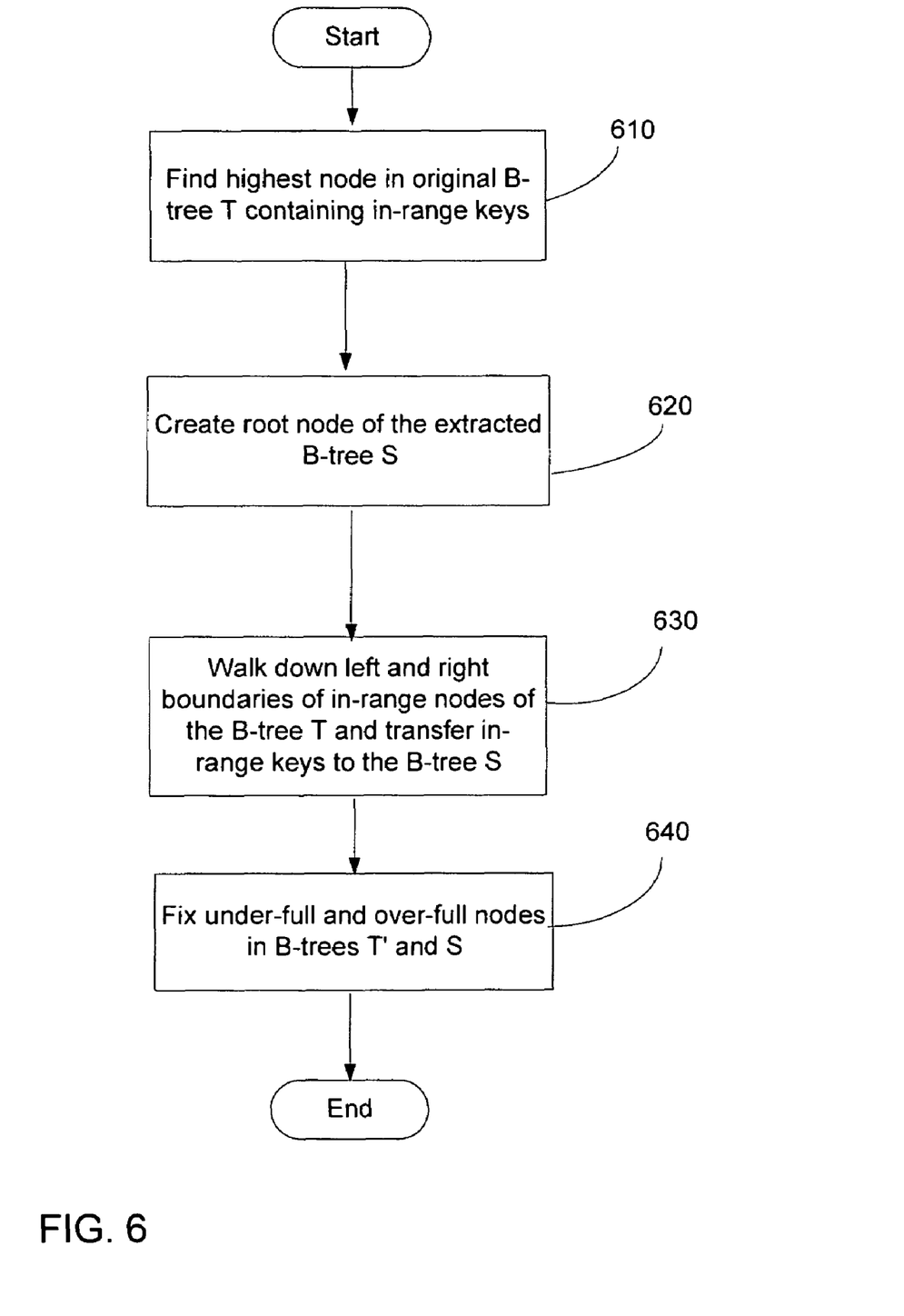
FIG. 6 is a flow diagram showing an excision operation for creating the two intermediate trees in FIG. 3.

The excision operation is now described in detail with reference to FIG. 6. First, it is noted that renaming the directory Y affects all keys v that satisfies the range query:

$$\text{"Y/"} \leq v \leq \text{"Y/}\infty\text{"} \quad (1)$$

Here the symbol "∞" is a special character defined to be greater than all characters in the set of alphanumeric symbols used for creating keys. All the keys that satisfy the range query in (1) are to be excised from the original B-tree T and placed in a new tree S.

The excision process carried out by the computer program for handling renaming in the B-tree may be generally described as follows. The renaming program walks down the original B-tree T and looks for keys satisfying the range query, and stops when it finds a node containing such a key, say at level L (step 610). The program removes all the keys at this node that fall within the range and the pointers between the keys, and place them in a new node—the root node of the extracted tree S, which is defined to be at level L in S (step 620). From the current node in the tree T, the program then walks down the tree T along two separate paths. The first path follows "Y/", while the second path follows "Y/∞". At every node visited, all the in-range keys at that node are excised and placed in a new node of the tree S at the same level of T from which the keys are removed. The new node's parent is the node created on the previous level in the tree S while walking down the path in T (step 630). The program continues until it reaches the leaf nodes along each of the two paths. At that point, the program fixes all under-full and over-full nodes in the two temporary trees T' and S (step 640).

The detailed steps implemented in one embodiment for the excision operation are now described. To find the highest node containing in range keys, the program sets a variable currentNode=root of T. The contents of currentNode may be denoted as $p_0 v_1 p_1 v_2 p_2 \ldots v_k p_k$. This means that the node identified as the currentNode contains k keys: $v_1, v_2, \ldots, v_k$, and its k+1 child pointers are $p_0, p_1, p_2, \ldots, p_k$. The node obtained by following a pointer $p_i$ is denoted as $f(p_i)$. If none of the keys in currentNode satisfies the range query in (1), the program finds i such that $v_i < \text{"Y/"} < \text{"Y/}\infty\text{"} < v_{i+1}$, and sets currentNode=$f(p_i)$. It then sets currentLevel=height of currentNode. The height is counted from the leaves of the B-tree, which have a height of 1.

Once the program finds a node containing a key in the original B-tree T that satisfies the range query, it creates the root node of the extracted tree S. To that end, it finds i such that $v_i < \text{"Y/"} \leq v_{i+1}$, and j such that $v_j < \text{"Y/}\infty\text{"} < v_{j+1}$. It then deletes the in-range keys from currentNode by setting its contents to be $$p_0 v_1 p_1 v_2 p_2 \ldots p_{i-1} v_i p_i v_{j+1} p_{j+1} \ldots v_k p_k \quad (2)$$

It should be noted that currentNode may be under-full as a result of having some of its keys removed. This issue will be addressed in a later step as described below.

The program then creates a new node SrootNode of the new (possibly under-full) B-tree S, and gives it the contents consisting of the excised keys and pointers from currentNode:

$$v_{i+1} p_{i+1} \ldots p_{j-1} v_j \quad (3)$$

Note that this combination is not a valid B-tree node yet, since the initial and final child pointers are missing. Those two pointers are added by setting the initial child pointer to the address of a newly created node, SleftNode, and setting the final child pointer to the address of another newly created node, SrightNode. Note that SrootNode may be under-full, but no action is taken on it, as S by construction may be an under-full B-tree. Also, the entire original contents of currentNode have been saved in either (2) or (3) except for $p_j$, and this is intentional. The currently orphaned node $f(p_j)$ will be rescued and merged with $f(p_i)$ in a later step.

The rename program then walks down the left and right boundaries of the in-range nodes of the B-tree T, and transfers in-ranges keys found in T to the tree S. To that end, the program sets currentLeftNode=$f(p_i)$, and sets currentRightNode=$f(p_j)$. It further sets currentLevel=currentLevel−1. The contents of currentLeftNode are denoted by $q_0 u_1 q_1 u_2 \ldots u_l q_l$, while the contents of currentRightNode are denoted by $r_0 w_1 r_1 w_2 \ldots w_m r_m$. While currentLevel≧1, the program finds i such that $u_i < \text{"Y/"} \leq u_{i+1}$, and finds j such that $w_j \leq \text{"Y/}\infty\text{"} < w_{j+1}$. The program then deletes the in-range keys from currentLeftNode and currentRightNode, and transfers all remaining keys into currentLeftNode by setting its contents to be $$q_0 u_1 q_1 u_2 q_2 \ldots q_{i-1} u_i q_i w_{r+1} r_{j+1} \ldots w_k r_k \quad (4)$$

If currentLevel=1, the program is at a leaf node, and all the child pointers are omitted from (4). Note that currentLeftNode is the result of merging two depleted nodes, so it might now be over-full or under-full, but no measure is taken at this point to address this out-of-balance issue.

The program then transfers the in-range keys that have been excised from currentLeftNode to SleftNode, by setting the contents of SleftNode to be $$u_{i+1} q_{i+1} \ldots q_{l-1} u_l \quad (5)$$

This combination is not yet a valid B-tree node, as it has no initial child pointer. This is fixed by creating a new node called newSleftNode, and setting the initial child pointer to its address. The program also transfers the in-range keys that were excised from currentRightNode to SrightNode by setting the contents of SrightNode to be $$r_0 w_1 r_1 w_2 \ldots r_{j-1} w_j \quad (6)$$

This combination is not yet a valid B-tree node, because it does not have a final child pointer. This is fixed by creating a new node called newSrightNode, and setting the final child pointer to its address. Also, SrightNote may be under-full, but no action is taken on it since S is allowed to be under-full by construction. Note that every pointer and key from currentLeftNode and currentRightNode appears in precisely one of expressions (4), (5), and (6) except for $r_j$. This is intentional—the orphaned node $f(r_j)$ will be merged with $f(q_i)$ on the step that generates expression (4) in the next iteration. The program then de-allocates the storage for currentRightNode, because all of its keys have been stored elsewhere, and nothing points to it anymore. If currentLevel>1, the program moves down a level by setting currentLeftNode=f($q_i$), currentRightNode=f($r_j$), and currentLevel=currentLevel−1. The program then repeats the steps above until the While loop ends.

At this time, the program fixes all under-full and over-full nodes as mentioned above. To that end, the program walks back up each of the tree from currentLeftNode, applying standard B-tree split or merge operations as necessary. In this process, the program does not stop if it reaches a node with a legal size, because its ancestors might still be under-full or over-full.

After the two intermediate trees T' and S are generated, the program renames the keys in the extracted tree S to reflect the changed name of the directory. As mentioned above, the goal of the overall operation is to rename the directory "Y" to "Z". The detailed steps discussed above are for performing step 1 of the strategy as in FIG. 5, namely excising all of the keys beginning with "Y/" from the original B-tree T, and placing them in the possibly under-full B-tree S. Step 2 of the high-level strategy is to change the keys of S so that they begin with "Z/" instead of "Y/", to obtain a new tree S'.

In a preferred embodiment, the modification of the keys in S is made very simple by using B-trees that do not store common prefixes in the keys. In such an arrangement, each node has a separate field containing the common prefix of all the keys in the node, while the keys store only the distinct suffices. Note that the prefix field does not include the prefix stored in the parent node, so the full value of a key for a given key suffix is obtained by concatenating the prefixes of all nodes visited to locate the key, starting from the root of the tree. Such a B-tree is referred to as a prefix B-tree. When the tree S is a prefix-tree, it is extremely easy to alter the entire key so that they begin with "Z/" instead of "Y/". This is because the prefix field of the root node of the tree S must originally begin with "Y/", so the desired new tree S' can be obtained by simply changing the prefix field of the root node to "Z/".

Turning now to the step of inserting the tree S' into the tree T', one relevant concept utilized by the invention is "strict insertion." The insertion of a B-tree A into a B-tree B is strict if all of the keys of A lie strictly between two consecutive keys in B. In the case of renaming a directory, the insertion of S' into T' is strict. This is because the original B-tree T should not contain a key what falls into the range of consecutive keys created by renaming the directory, otherwise the renaming is illegal (because it conflicts with an existing pathname) and should not have been allowed. As described below, the strictness of the insertion of S' into T' significantly simplifies the insertion operation.

Figure 7:
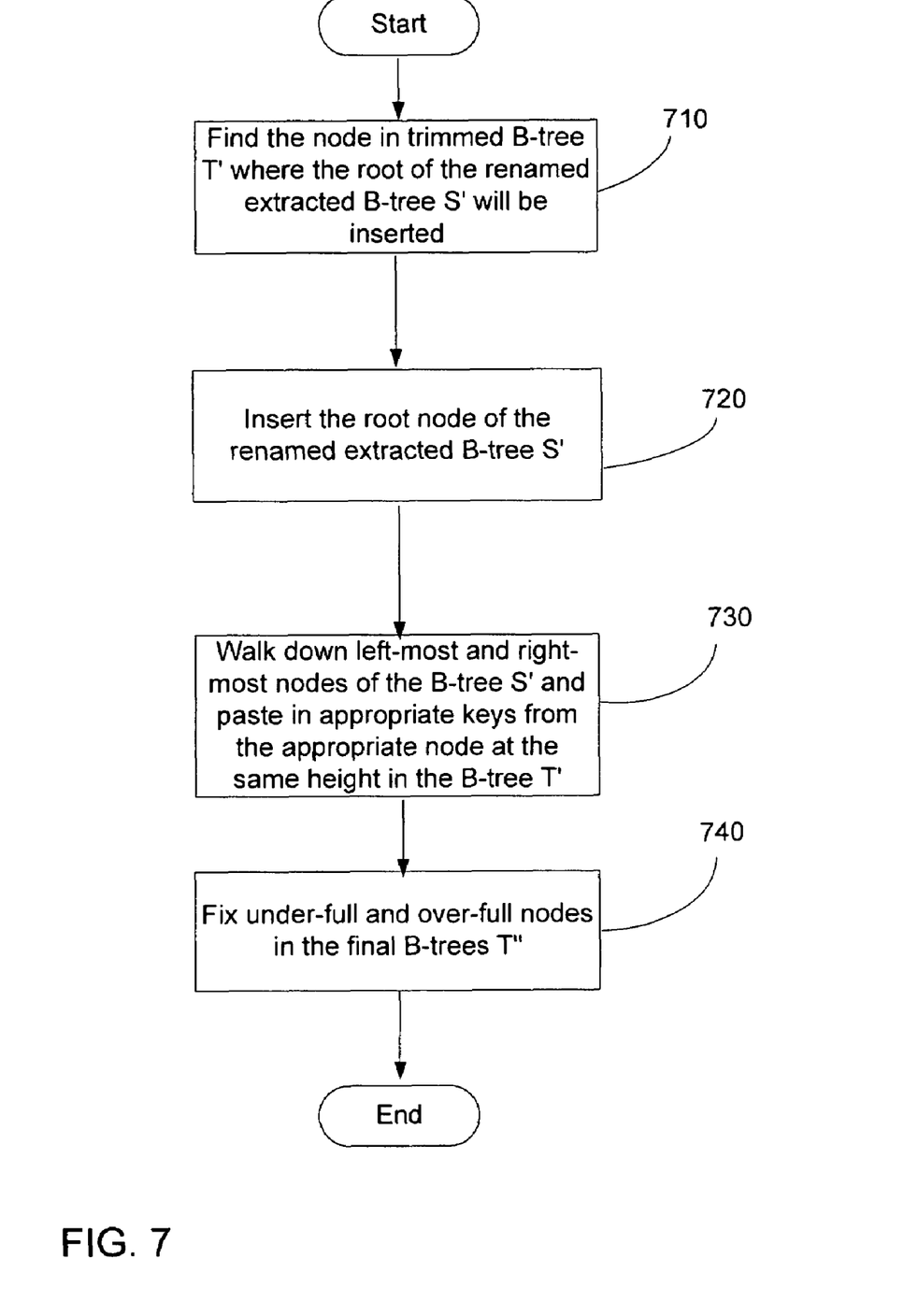
FIG. 7 is a flow diagram showing a B-tree insertion operation for creating the final B-tree of FIG. 4.

The insertion of the tree S' into the tree T' may be briefly summarized as follows with reference to FIG. 7. Suppose that the height of S' is L. To perform the insertion, the program first finds the node in the tree T' where the root of the tree S' should be inserted (step 710). To that end, the program walks down the tree T' as if trying to insert one of the keys from S', but stops when it gets to a node at height L. In this regard, it does not matter which of the keys from S' the program chooses, since the insertion is strict, so any choice will lead to the same path. The program then inserts all the keys from the root node of S' into the node it just reached (step 720). From there, the program continues walking down the tree T' as if trying to insert one of the keys from S'. In this regard, the program will walk down the tree S' along two different paths: the left-most path and the right-most path, and paste in the appropriate keys from the appropriate node at the same height in T' (step 730). At each level, the program works with three nodes: the T' node, the left S' node, and the right S' node. The keys in the node in T' falls into two categories: "small" keys that are smaller than the keys of S', and "large" keys that are larger than the keys of S'. The keys in these three nodes are reshuffled as follows: the T'-node is deleted, its small keys are inserted into the left S' node, and its large keys are inserted into the right S' node. This is done at each level down to the leaves of the tree, at which point the insertion is complete. Many of the nodes involved in the reshuffling might be over-full or under-full, meaning that the tree is not balanced. After all the keys of the B-tree S' have been inserted into the proper nodes of the B-tree T', the over-full and/or under-full nodes of the merged tree are fixed easily with standard B-tree operations (step 740).

The detailed steps in one implementation for performing the insertion are now described. The program starts by setting currentNode=root of T', currentLevel=height of T', an L=height of S'. the contents of currentNode are denoted as $p_0 v_1 p_1 v_2 p_2 \ldots v_k p_k$. While currentLevel>L, the program finds i such that $v_i < \text{"Z/"} < \text{"Z/}\infty\text{"} < v_{i+1}$. The program then sets currentNode=f(pi), and currentLevel=currentLevel−1.

The program then inserts the root node of S' into T'. The contents of S' of the root node S' are denoted as $q_0 u_1 q_1 u_2 \ldots u_l q_l$. The program first finds i such that $v_i < \text{"Z/"} < \text{"Z/}\infty\text{"} < v_{i+1}$, and then inserts the keys from the root node of S' into current node by setting its contents to be $$p_0 v_1 p_1 \ldots p_{i-1} v_i q_0 u_1 q_1 u_2 \ldots u_l q_l v_{i+1} p_{r+1} \ldots v_k p_k \quad (7)$$

Here the pointer $p_i$ is orphaned, by the contents of the node that it points to will be rescued a later step. Also, currentNode might become over-full, but that will be addressed at a later step.

The program then walks down the left-most and right-most nodes of S', pasting in the appropriate keys from the appropriate node at the same height in T'. This is accomplished by the following steps. First, the program walks down a level in both trees by setting SleftNode=f($q_0$), SrightNode=f($q_l$), and currentNode=f($p_i$). Here the contents of SleftNode are denoted by $q_0 u_1 q_1 u_2 \ldots u_l q_l$, and the contents of SrightNode are denoted by $r_0 w_1 r_1 w_2 \ldots w_m r_m$. The program then repeats the following three steps until currentNode is a leaf node. First, the program finds i such that $v_i < \text{"Z/"} < \text{"Z/}\infty\text{"} < v_{i+1}$. The keys $v_1, \ldots,$ vi are called the small keys, and the keys $v_{i+1}, \ldots, v_k$ are the large keys. The program inserts the small keys into SleftNode by setting its contents to be $$p_0 v_1 \ldots p_{i-1} v_i q_0 u_1 q_1 u_2 \ldots u_l q_l \quad (8)$$

The program then inserts the large keys into SrightNode by setting its contents to be $$r_0 w_1 r_1 w_2 \ldots w_m r_m v_{j+1} p_{j+1} \ldots v_k p_k \quad (9)$$

If the program is already at a leaf node, the pointers in (8) and (9) are omitted. In these steps, $p_i$ is made an orphan, because it does not appear in (8) and (9). Nevertheless, the orphan's contents will be rescued in the next iteration of the steps that generate the expressions of (8) and (9).

The program then de-allocates the storage for currentNode, because all of its keys have been stored elsewhere, and no nodes point to it anymore. The program continues by walking down a level in both T' and S' trees by setting SleftNode=f($q_0$), SrightNode=f($r_m$), and currentNode as f($p_i$). The program then repeats the While loop until it reaches the leaf nodes.

After the T' tree and S' tree are merged, the SleftNode, SrightNode, and their ancestors might be over-full or under-full. To balance the merged tree T'', the program walks up the tree, starting from SleftNode and splitting or merging each node if necessary. The program then does a similar walk starting from SrightNode. After the tree T" is properly balanced, the process of modifying the B-tree of a file system in response to the renaming of a directory is complete.

It will be appreciated that a new and efficient method for performing the operation of renaming a directory in a B-tree has been disclosed herein. In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method of renaming a range of consecutive keys in an original B-tree having a plurality of keys stored therein, comprising:
    excising the range of consecutive keys from the original B-tree, the original B-tree representing a file system, wherein renaming an element of the file system requires the changing of the values of the range of consecutive keys, the excision of the range of consecutive keys converting the original B-tree into a trimmed tree;
    balancing the trimmed tree;
    storing the range of consecutive keys excised from the original B-tree to form an extracted tree;
    renaming the keys of the extracted tree to form a modified extracted tree;
    inserting the modified extracted tree into the balanced trimmed tree to form a final B-tree; and
    balancing the final B-tree,
    wherein the original B-tree represents a hierarchical namespace of a file system of a computing device, and the range of consecutive keys belong to a directory of the file system such that the directory is represented as the B-tree, and wherein the changing of the values of the range of consecutive keys is in connection with the directory being renamed,
    wherein each key in the original B-tree contains a pathname for a file or directory of the file system prior to the renaming of the directory,
    wherein the excised range of consecutive keys satisfy a range query "Y/"≦v≦"Y/∞", wherein "Y" represents the element of the file system to be renamed, "v" represents keys in the B-tree, and "∞" represents a special character defined to be greater than all characters in a set of alphanumeric symbols used for creating the plurality of keys, and
    wherein the excising further comprises finding a root node of the extracted tree by traversing the original B-tree and stopping at a node in the original B-tree that has one or more keys that satisfy the range query, moving down from the node along two separate paths including a first path that follows "Y/" and a second path that follows "Y/∞", and continuing until reaching a leaf node along each of the two paths.

2. A method as in claim 1, wherein the step of changing includes changing a prefix field of a root node of the extracted tree.

3. A method as in claim 1, wherein the step of inserting the modified extracted tree into the trimmed tree involves a strict insertion.

4. A computer-readable storage medium having computer-executable instructions for performing steps for renaming a range of consecutive keys in an original B-tree having a plurality of keys stored therein, comprising:
    excising the range of consecutive keys from the original B-tree, the original B-tree representing a file system, wherein renaming an element of the file system requires the changing of the values of the range of consecutive keys, the excision of the range of consecutive keys converting the original B-tree into a trimmed tree;
    balancing the trimmed tree;
    storing the range of consecutive keys excised from the original B-tree to form an extracted tree;
    renaming the keys of the extracted tree to form a modified extracted tree;
    inserting the modified extracted tree into the balanced trimmed tree to form a final B-tree; and
    balancing the final B-tree,
    wherein the original B-tree represents a hierarchical namespace of a file system of a computing device, and the range of consecutive keys belong to a directory of the file system such that the directory is represented as the B-tree, and wherein the changing of the values of the range of consecutive keys is in connection with the directory being renamed,
    wherein each key in the original B-tree contains a pathname for a file or directory of the file system prior to the renaming of the directory,
    wherein the excised range of consecutive keys satisfy a range query "Y/"≦v≦"Y/∞", wherein "Y" represents the element of the file system to be renamed, "v" represents the keys in the B-tree, and "∞" represents a special character defined to be greater than all characters in a set of alphanumeric symbols used for creating the plurality of keys, and
    wherein the excising further comprises finding a root node of the extracted tree by traversing the original B-tree and stopping at a node in the original B-tree that has one or more keys that satisfy the range query, moving down from the node along two separate paths including a first path that follows "Y/" and a second path that follows "Y/∞", and continuing until reaching a leaf node along each of the two paths.

5. A computer-readable storage medium as in claim 4, wherein the step of changing includes changing a prefix field of a root node of the extracted tree.

6. A computer-readable storage medium as in claim 4, wherein the step of inserting the modified extracted tree into the trimmed tree involves a strict insertion.

7. A method of modifying a B-tree, wherein the B-tree represents a file system of a computing device, wherein renaming an element of the file system requires the changing of the values of the range of consecutive keys, each key in the B-tree contains a pathname for a file or directory of the file system, the method comprising:
    excising keys of a directory of the file system being renamed from the B-tree, the directory being represented as the B-tree, the excision of the keys of the directory converting the B-tree into a trimmed tree;
    balancing the trimmed tree;
    storing the keys of the directory excised from the B-tree in an extracted tree;
    changing the values of the keys of the extracted tree to reflect a new name of the directory;

inserting the extracted tree with changed values of the keys into the balanced trimmed tree to form a final B-tree; and balancing the final B-tree, wherein the excised keys of the directory satisfy a range query "Y/"≦v≦"Y/∞", wherein "Y" represents the element of the file system to be renamed, "v" represents the keys in the B-tree, and "∞" represents a special character defined to be greater than all characters in a set of alphanumeric symbols used for creating the plurality of keys, and wherein the excising further comprises finding a root node of the extracted tree by traversing the original B-tree and stopping at a node in the original B-tree that has one or more keys that satisfy the range query, moving down from the node along two separate paths including a first path that follows "Y/" and a second path that follows "Y/∞", and continuing until reaching a leaf node along each of the two paths.

8. A method as in claim 7, wherein the step of changing the values of the keys of the extracted tree includes changing a prefix field of a root node of the extracted tree.

9. A computer-readable storage medium having computer-executable instructions for performing steps for modifying a B-tree, wherein the B-tree represents a file system of a computing device, wherein renaming an element of the file system requires the changing of the values of the range of consecutive keys, each key in the B-tree contains a pathname for a file or directory of the file system, the method comprising:

excising keys of a directory of the file system being renamed from the B-tree, the directory being represented as the B-tree, the excision of the keys of the directory converting the B-tree into a trimmed tree;

balancing the trimmed tree;

storing the keys of the directory excised from the B-tree in an extracted tree;

changing the values of the keys of the extracted tree to reflect a new name of the directory;

inserting the extracted tree with changed values of the keys into the balanced trimmed tree to form a final B-tree; and balancing the final B-tree, wherein the excised keys of the directory satisfy a range query "Y/"≦v≦"Y/∞", wherein "Y" represents the element of the file system to be renamed, "v" represents the keys in the B-tree, and "∞" represents a special character defined to be greater than all characters in a set of alphanumeric symbols used for creating the plurality of keys, and wherein the excising further comprises finding a root node of the extracted tree by traversing the original B-tree and stopping at a node in the original B-tree that has one or more keys that satisfy the range query, moving down from the node along two separate paths including a first path that follows "Y/" and a second path that follows "Y/∞", and continuing until reaching a leaf node along each of the two paths.

10. A computer-readable storage medium as in claim 9, wherein the step of changing the values of the keys of the extracted tree includes changing a prefix field of a root node of the extracted tree.

\* \* \* \* \*